July 11, 1972   J. S. STEWART   3,676,278
PADDED PANEL FOR AUTOMOBILE DOOR
Original Filed Dec. 21, 1967
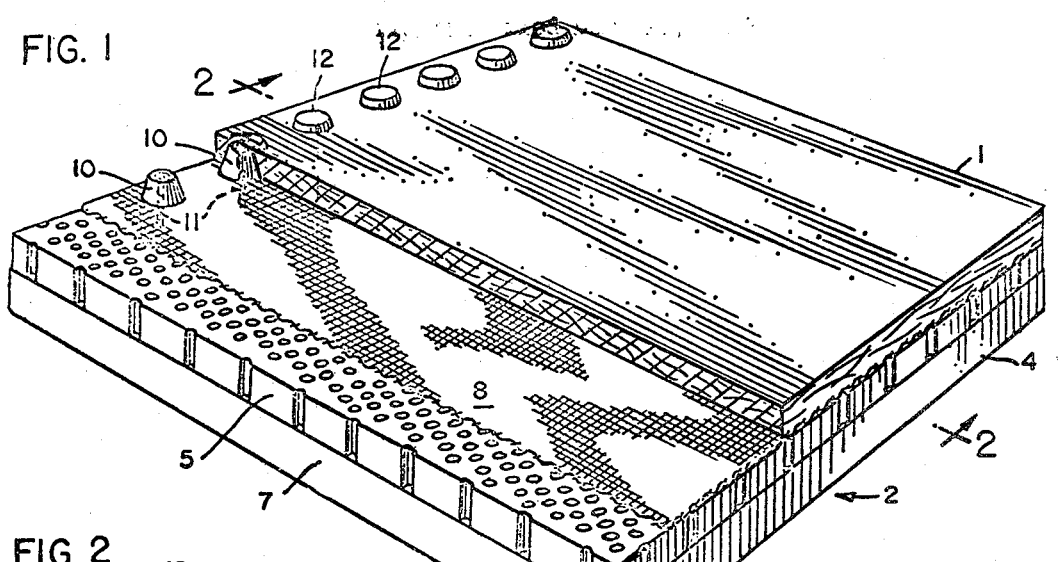
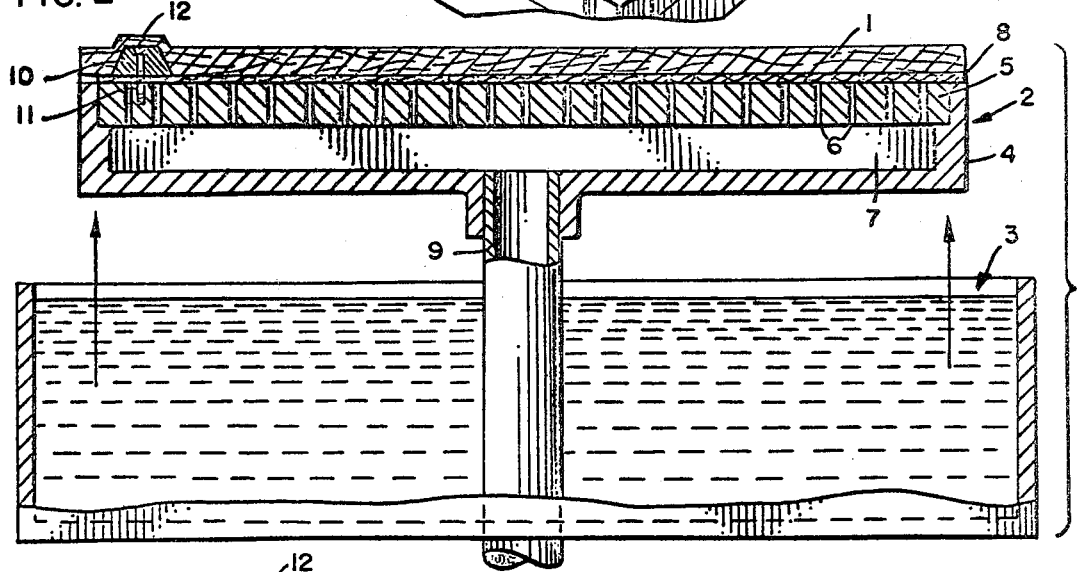
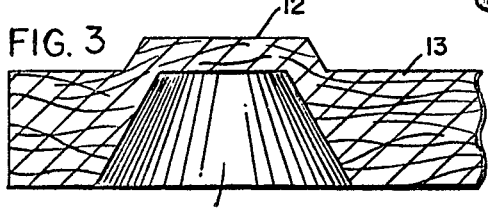
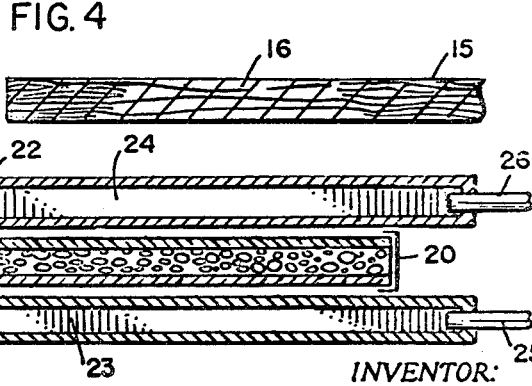
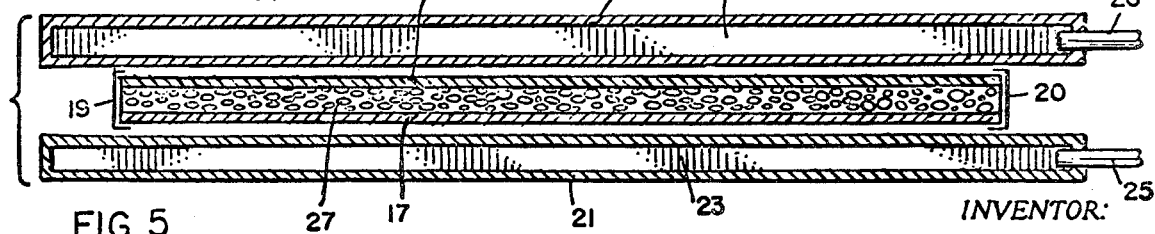
INVENTOR:
JOHN S. STEWART
BY Johnston, Root, O'Keeffe, Keil, Thompson, Shurtleff
ATTORNEYS

United States Patent Office

3,676,278
Patented July 11, 1972

3,676,278
PADDED PANEL FOR AUTOMOBILE DOOR
John S. Stewart, St. Charles, Ill., assignor to Hawley
Products Company, St. Charles, Ill.
Original application Dec. 21, 1967, Ser. No. 692,426.
Divided and this application Nov. 19, 1969, Ser.
No. 878,019
Int. Cl. B32b 3/00, 5/14
U.S. Cl. 161—43                     3 Claims

ABSTRACT OF THE DISCLOSURE

A cushioned article is provided comprising a molded fiber foundation panel having porous and non-porous felted fibrous areas, the porous areas having a sufficiently lower fiber density to permit gases to escape therethrough, a non-porous facing member spaced from said foundation panel, and an expanded cellular cushioning substance in the space between said panel and said facing member in contact with the inner sides of said facing member and said foundation panel.

---

This application is a division of U.S. application Ser. No. 692,426, filed Dec. 21, 1967, now abandoned.

It is well known in the art that fibers, for example, cellulose fibers, can be felted into various types of articles in several different ways. One method involves air felting and another method involves felting from an aqueous slurry of the fibers. Usually, a foraminous felter is used and suction is applied to the inside of the felter so as to cause the fibers to be drawn onto a screen. If the felter screen is flat, the resultant article will also be flat or the felter screens can be shaped to produce articles of different shapes. One way of felting an article is to form a preform which is relatively thick and thereafter compressing said preform between solid dies in order to produce a more dense fibrous structure. Molded fiber articles made in this manner have many different uses.

One use for molded fiber articles is to form foundation panels for padded structures. Currently in the automobile industry there is great emphasis on safety and the provision of padded interior auto trim. One type of padded interior auto trim is a padded door panel for the interior of automobile doors. These door panels can be made by placing a facing member, such as a vacuum formed, non-porous plastic sheet in a die, placing a foundation panel in another die, then bringing the two dies together in such a way that there is an internal space between the foundation panel and the facing sheet, then clamping or otherwise sealing the edges of the foundation panel and the facing sheet and introducing into the internal space a foaming substance, for example, a polyurethane foam. When the ingredients of the foaming substance react, the foam expands through the internal space, thereby producing a resilient or padded structure. One problem which has been encountered is the necessity to bleed off the gases and/or air generated by the foaming plastics used for padding. It is possible to do this by making holes in the foundation panel but this involves a substantial amount of labor and unless the holes are quite small, there is also the possibility that some of the foaming plastic will escape.

One of the objects of the present invention is to provide a new and improved process of making a molded fiber panel having porous areas which will permit the escape of internally generated gases and/or air.

Another object of the invention is to provide a process of the type described in which the gas escape mechanism is produced in the molded fiber panel during the manufacturing operation so that no subsequent operations, such as hole boring, are required.

A further object of the invention is to provide new and useful molded fiber articles having predetermined porous areas.

Another object of the invention is to provide new and useful cushioned articles which are particularly well adapted for use as automobile door panels.

Other objects and advantages of the invention will appear from the following description in conjunction with the accompanying drawings in which:

FIG. 1 is an illustration, with parts broken away, of a forming die with a fibrous preform thereon prepared in accordance with this invention;

FIG. 2 is a partial sectional view, with parts broken away, of an apparatus showing the manner in which a fibrous preform is formed on the forming die of FIG. 1, the partial section of the forming die being taken along the line 2—2 of FIG. 1;

FIG. 3 is an enlarged detailed view, with parts broken away, of a fibrous preform;

FIG. 4 is an enlarged sectional view, with parts broken away, of the preform shown in FIG. 3 after it has been compressed between solid dies; and FIG. 5 illustrates an apparatus for making a composite molded article comprising a molded fiber foundation or backing panel or board having porous and non-porous fibrous areas, a non-porous facing member spaced from said foundation panel and an expanded cellular cushioning substance in the space between said panel and said facing member.

In accordance with the invention, a fibrous product having predetermined porous and non-porous areas is prepared by felting fibers onto a foraminous felter and blocking off predetermined areas of said felter with outwardly extending blocking members to form a preform in which fewer fibers are deposited in the areas where the blocking members are located as compared to the balance of the felter. The preform is then pressed between molds to produce a more dense molded fiber product having porous or low density areas that breathe. The resultant product is especially useful in preparing a cushioned or padded article.

A cushioned or padded article can be prepared by using the molded fiber article containing porous areas as a founation panel by combining it with a facing member sheet, e.g., polyvinyl chloride sheet, so that there is a space between said facing sheet and said foundation panel, and injecting into said space a cushioning substance, e.g., polyurethane, foam, which expands to form a cellular structure. During said expansion, the foundation panel and the facing member are held together at the edges in any suitable manner, for example, by clamps, and any gas and/or air which is formed or is present in the internal space occupied by the cushioning substance is bled off through the porous areas of the molded fiber foundation panel.

Referring to FIGS. 1 and 2, in the first step of the process a fibrous preform 1 is prepared by immersing a foraminous mold generally indicated at 2 in an aqueous slurry of fibers, for example, cellulose fibers generally indicated at 3.

The mold 2 consists of a supporting frame 4 to which is secured a plate 5 having a number of apertures 6 which on one end are in communication with a chamber 7 and on the other end with a screen 8. The chamber 7 also communicates with a tubular member 9 which in turn is connected to a vacuum pump or other pressure reducing source.

On top of the screen 8 there are mounted a number of blocking members or buttons 10 which are secured by means of screws 11, or other suitable means, to the perforated plate 5. These blocking members, as shown, are generally in the form of frustums. In the drawings they are frusto conical. The size will vary depending upon the size of the article and the extent to which porous areas are desired. Thus, in preparing a preform approximately ⅜ inch thick, the buttons 10 can be, for example, ⁵⁄₁₆ inch high with a top planar surface ½ inch in diameter and a tapering or sloping side surface making an angle of 30° with a vertical plane.

When the mold 2 is immersed in the batch or slurry of fibers 3 and suction is applied to the space 7, the fibers from the slurry are accreted or felted on the upper surface of the screen 8, thereby forming the preform 1. During the accreting or felting process, due to the fact that the members 10 act as blocking members, only a relatively small amount of felted fibers is deposited over the top of the blocking members 10 as shown at 12. When the formation of the preform is complete and the desired amount of fibers has been deposited, the entire assembly is moved upwardly out of the bath as shown in FIG. 2. The preform can be dried by sucking air through it or in any other suitable manner. It can then be removed from the screen 8. At this point the portion of the preform which has been blocked off by the blocking members 10 has an area 12 with fewer fibers than the main body 13 of the preform. It also contains a recess or hollow portion 14 generally conforming to the shape of the blocking members 10. The preform is then compressed between solid dies in order to produce a more dense, relatively rigid structure which can have some flexibility but is quite strong. In this way, the portion of the preform shown in FIG. 3 is densified to produce a molded fibrous structure as shown in FIG. 4. The thickness of this molded fibrous structure can be varied, depending upon the amount of pressure applied and the desired thickness, rigidity, impact strength and tensile strength. An excellent foundation panel for making automobile interior trim can be prepared by reducing a fibrous preform ⅜ inch in thickness in the area 13 (FIG. 3) to ⅛ inch in thickness in the area 15 (FIG. 4). The area 16 contains fewer fibers and is sufficiently porous to permit a gas to pass therethrough when under atmospheric or superatmospheric pressures. The blocking members can have different shapes, e.g., vertical sides or rectangular cross sections, but sloping sides are preferred to facilitate removal of the preform.

In order to make a cushioned article, such as interior trim for an automobile door panel, a molded fibrous structure of the type shown in FIG. 4 is employed as a foundation panel and is placed in a mold. A facing member, such as, for example, a polyvinyl chloride material, is also placed in a mold. A cushioning substance, such as polyurethane foam, is then applied to the interior surface of the facing member and the facing member and the molded fibrous foundation panel are brought together with the cushioning substance therebetween. They are clamped at the edges so that the cushioning substance cannot escape and the resultant structure is heated in order to produce a reaction in the cushioning substance. This causes the generation of gas which escapes through the porous areas of the foundation panel.

The general procedure is illustrated in FIG. 5 in which a facing member 17 is shown in assembled relationship with a molded fibrous foundation panel 18. The members 17 and 18 are spaced from each other and the space between them is occupied by a suitable substance which upon heating will expand and form a cellular structure. Clamps 19 and 20 are applied to squeeze the margins or edges of the resultant structure together and thereby seal them so there will be no substantial loss of the cushioning substance when the latter is expanded. Heat is applied through dies 21 and 22 which can have hollow spaces 23 and 24, respectively for the introduction of a heating fluid, such as steam or hot air, through the pipes 25 and 26. As previously indicated, the heating causes the cushioning substance 27 to expand and fill the space between the facing member 17 and the foundation panel 18. At the same time, any gases that are present or which are generated, escape through porous areas in the foundation panel 18.

The size and number of the porous areas in the foundation panel 18 can be varied. The location can also be varied. If desired, the blocking members may be placed near the central part of the foraminous die in FIG. 1 rather than near the margin as shown. This, in turn, produces porous areas in the central part rather than near the edge. In a similar manner these areas can be staggered by placing the blocking members 10 in various selected locations.

The positions of the porous areas, while primarily located to obtain maximum efficiency in bleeding off gas, can also be located in such a way as to accomplish other purposes. For example, where a door panel is being manufactured and it is desirable to place decorative trim, an armrest, or other structures on the interior of the door panel, the porous areas can be so positioned as to be in alignment with fastening elements so that the latter can be pushed through the weaker porous areas, thereby avoiding the necessity for boring holes in the foundation panel.

In a series of tests using molded cellulose fiber foundation panels, it was found that a blocking member of the type previously described having an upper surface diameter of ½ inch would allow the passage of 300 ml. of air in 51 seconds. When the upper diameter of the blocking member was increased to ⅝ inch, the same amount of air passed through the resultant porous area of a molded cellulose fiber foundation panel in 26 seconds. When this diameter was increased to ¾ inch the same amount of air passed through the panel in 20 seconds. When it was increased to ⅞ inch the same amount of air passed through the panel in 11 seconds and when it was increased to 1 inch in diameter 300 ml. of air passed through the panel in 8 seconds. Thus it will be apparent that the porosity or ability to pass air or gas through the foundation panel can be controlled over a wide range of varying shape and/or thickness of the blocking member.

While the invention is usually employed in making molded fiber articles from cellulose fibers, it will be recognized that various combinations of cellulose fibers can be used, for example, a suitable mixture of cellulose fibers consists of 18 parts northern kraft, 30 parts refined rag, and 60 parts shredded wood. Cut bundles of glass filaments can be incorporated with the cellulose fibers. Other fibers or filaments can be used, such as, for example, polyester filaments, polyolefine filaments and polyacrylonitrile filaments. Resins can be incorporated with the fibers or filaments as disclosed, for example, in U.S. Pats. 2,702,-241, 2,698,558, 2,932,601 and 3,336,247.

While good results have been obtained by using polyurethane foam, other substances having the desired resiliency and capable of forming a cellular structure can be employed. The preparation of flexible foams from polyurethane is described in "Polyurethanes" by Dombrow, Rheinhold Publishing Corporation, 1957. The preparation of cellular polystyrene starting with various types of granules or pre-expanded particles capable of being expanded on heating is described in a number of patents, including U.S. 2,779,062, U.S. 2,787,809, U.S. 2,865,800 and U.S. 2,861,046.

The invention is advantageous in providing a new and improved process for making felted fibrous articles having predetermined porous and practically non-porous areas. It is especially advantageous in making padded interior door panels for automobiles and other padded articles having an interior cellular structure generated in situ with gas formation. By using the invention very little expense is incurred in modifying the preform dies and considerable amounts of labor and expense are eliminated in later stages of manufacture of interior automobile door panels and other padded structures.

The invention is hereby claimed as follows:

1. A cushioned article comprising a fiber board backing member of molded fibers normally incapable of passage of gases therethrough except in localized portions, a porous synthetic foam layer superimposed thereon, and a non-porous plastic facing member superimposed on said synthetic foam, said localized portions of said backing member having fewer fibers and less density than the remainder thereof and adapted to permit gases from the foam layer to escape therethrough.

2. An article as claimed in claim 1 in which the edges of said backing member and said facing member are secured together to prevent escape of said cushioning substance.

3. An article as claimed in claim 1 which is a padded door panel for the interior of automobile doors.

References Cited

UNITED STATES PATENTS

| | | | |
|---|---|---|---|
| 1,780,623 | 11/1930 | Loetscher | 162—188 |
| 2,369,658 | 2/1945 | Burns | 161—160 |
| 2,843,341 | 7/1958 | Dannenberg et al. | 161—159 |
| 2,962,406 | 11/1960 | Rosa | 161—160 |
| 3,385,749 | 5/1968 | Hampshire | 161—166 |
| 3,396,070 | 8/1968 | Gambill et al. | 161—159 |
| 3,444,956 | 5/1969 | Gaffney | 161—159 |

MORRIS SUSSMAN, Primary Examiner

U.S. Cl. X.R.

161—149, 151, 160; 162—188